US009481577B2

(12) United States Patent
Targett et al.

(10) Patent No.: US 9,481,577 B2
(45) Date of Patent: Nov. 1, 2016

(54) REACTOR WITH INDUCTION HEATER

(71) Applicant: LP Amina LLC, Charlotte, NC (US)

(72) Inventors: Matthew Targett, Shanghai (CN);
Hani Gadalla, Madison, WI (US)

(73) Assignee: LP AMINA LLC, Charlotte, NC (US)

( * ) Notice: Subject to any disclaimer, the term of this patent is extended or adjusted under 35 U.S.C. 154(b) by 6 days.

(21) Appl. No.: 14/520,075

(22) Filed: Oct. 21, 2014

(65) Prior Publication Data
US 2015/0110703 A1   Apr. 23, 2015

Related U.S. Application Data

(60) Provisional application No. 61/893,978, filed on Oct. 22, 2013.

(51) Int. Cl.
*C01B 31/02* (2006.01)
*C01B 31/30* (2006.01)
*C01B 31/32* (2006.01)

(52) U.S. Cl.
CPC ............ *C01B 31/32* (2013.01); *C01B 31/303* (2013.01); *C01B 31/308* (2013.01)

(58) Field of Classification Search
CPC .... C01B 31/32; C01B 31/308; C01B 31/303
USPC .................................................. 423/441, 439
See application file for complete search history.

(56) References Cited

U.S. PATENT DOCUMENTS

| 557,057 A | 3/1896 | Dickerson |
|---|---|---|
| 572,636 A | 12/1896 | Hewes |
| 630,690 A | 8/1899 | Hartenstein |
| 656,156 A | 8/1900 | Horry |
| 656,599 A | 8/1900 | Doolittle |
| 819,219 A | 5/1906 | Hartenstein |
| 844,018 A | 2/1907 | Hartenstein |
| 888,610 A | 5/1908 | Hartenstein |
| 889,124 A | 5/1908 | Hartenstein |
| 938,581 A | 11/1909 | Hartenstein |
| 946,432 A | 1/1910 | Hartenstein |
| 946,510 A | 1/1910 | Hartenstein |
| 946,511 A | 1/1910 | Hartenstein |
| 966,542 A | 8/1910 | Hartenstein |
| 1,292,386 A | 1/1919 | Becket |

(Continued)

OTHER PUBLICATIONS

International Search Report and Written Opinion mailed Jan. 14, 2015 regarding Application No. PCT/US14/61648.

(Continued)

*Primary Examiner* — Daniel C McCracken
(74) *Attorney, Agent, or Firm* — Foley & Lardner LLP

(57) ABSTRACT

A method for producing usable product in a reactor including introducing a viscous mixture including usable product and unconverted reactant into a chamber of a housing through an inlet, wherein the mixture has a temperature greater than ambient temperature when introduced into the chamber; heating the viscous mixture in the chamber using at least one of an induction heater, an exothermic reaction, a microwave heater, a radio frequency heater, an electrical resistance heater, a laser heater, a plasma heater, and a heated fluid; converting at least a portion of the unconverted reactant to usable product, wherein at least a portion of the usable product is produced in the viscous mixture; and transferring the viscous mixture including usable product from the housing through an outlet.

23 Claims, 9 Drawing Sheets

(56) References Cited

U.S. PATENT DOCUMENTS

| | | | |
|---|---|---|---|
| 1,374,317 | A | 4/1921 | Norton |
| 1,434,451 | A | 11/1922 | Reid |
| 1,573,095 | A | 2/1926 | Saklatwalla, et al. |
| 1,941,172 | A | 12/1933 | Hibi |
| 1,974,900 | A | 9/1934 | Shoup |
| 2,380,008 | A * | 7/1945 | Abrams ............ C01B 31/32 423/442 |
| 2,422,734 | A | 6/1947 | Jung |
| 2,778,716 | A | 1/1957 | Bagley |
| 2,869,990 | A | 1/1959 | Burgess |
| 4,137,295 | A * | 1/1979 | Tamers .......... B01J 19/0013 423/439 |
| 4,213,955 | A | 7/1980 | Casciani et al. |
| 4,594,236 | A | 6/1986 | Eriksson |
| 4,644,557 | A | 2/1987 | Ebeling et al. |
| 6,049,560 | A | 4/2000 | Freeman |
| 6,089,855 | A | 7/2000 | Becker et al. |
| 6,471,937 | B1 | 10/2002 | Anderson et al. |
| 7,582,268 | B1 | 9/2009 | Bozzano et al. |
| 7,749,291 | B2 | 7/2010 | Seidel |
| 2002/0082458 | A1 | 6/2002 | Peters et al. |
| 2008/0099325 | A1 * | 5/2008 | Ludlow-Palafox ..... C10B 19/00 204/157.43 |
| 2010/0270142 | A1 * | 10/2010 | Kong .................. B01J 19/088 204/173 |
| 2012/0160662 | A1 * | 6/2012 | Al-Shamma'a ........ B01J 6/008 204/157.15 |
| 2012/0263640 | A1 | 10/2012 | Latta et al. |

OTHER PUBLICATIONS

Tagawa et al, The Kinetics of the Formation of the Calcium Carbide in a Solid-Solid Reaction dated Jan. 22, 1962, 4 pages.
Kim et al, CaC2, Production from CaO and Coal or Hydrocarbons in a Rotating-Arc Reactor dated 1979, 6 pages.
Mu et al, A Rotary Kiln Process for Making Calcium Carbide dated 1987, Ind. Eng. Chem. Res., 8 pages.
Erasmus, The Application of Plasma-Arc Technology for the Production of Calcium Carbide dated 1991, 6 pages.
Zhu et al, A d.c. plasma-fluidized bed reactor for the production of calcium carbide dated 1995, Journal of Materials Science, 8 pages.
Naas et al., Solid-Phase Synthesis of Calcium Carbide in a Plasma Reactor dated Dec. 4, 1998, Plasma Chemisty and Plasma Processing, vol. 18, No. 3, 20 pages.

* cited by examiner

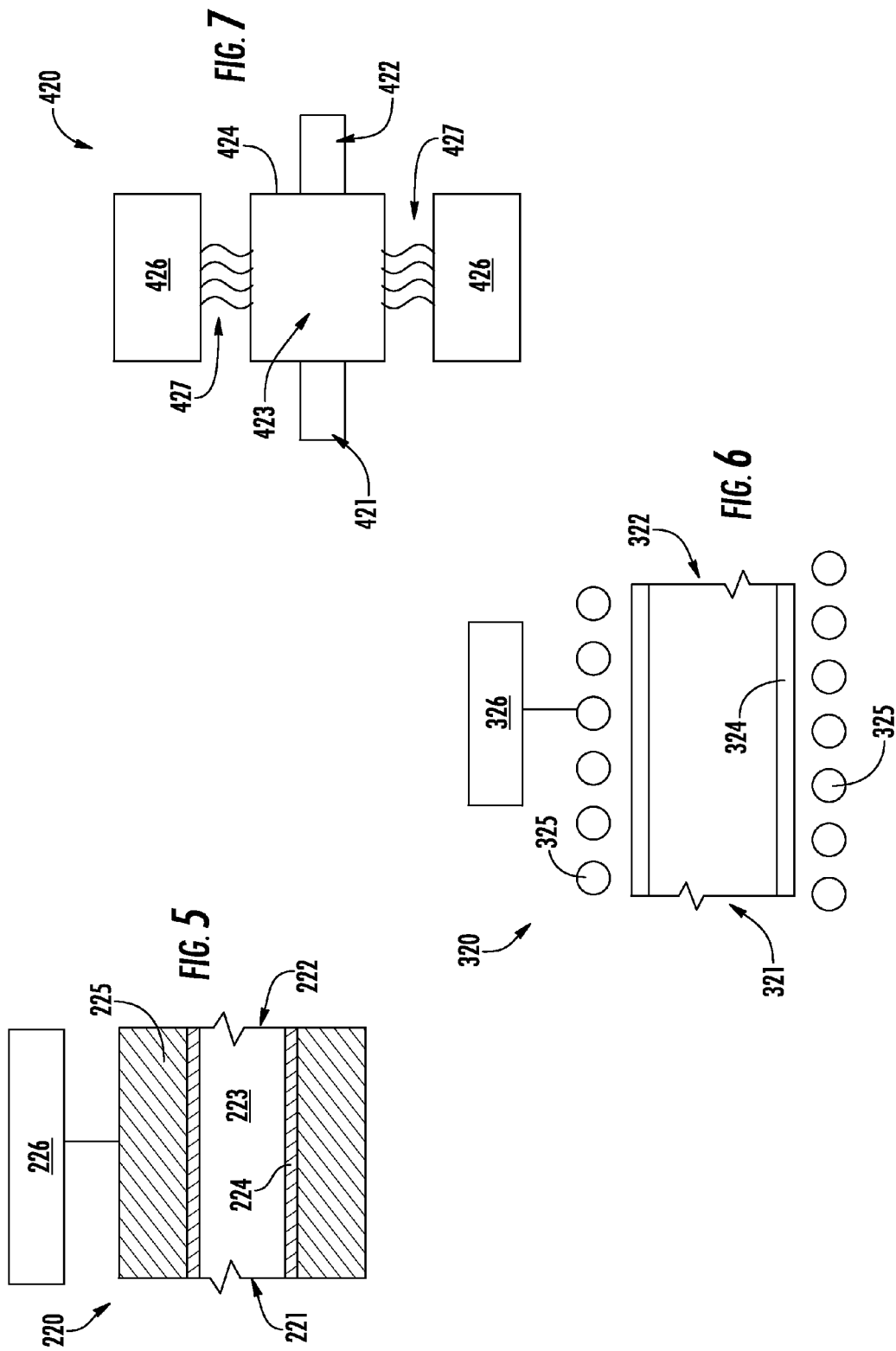

REACTOR WITH INDUCTION HEATER

CROSS-REFERENCE TO RELATED PATENT APPLICATIONS

This application claims the benefit of and priority to U.S. Provisional Patent Application No. 61/893,978, which was filed on Oct. 22, 2013. U.S. Provisional Patent Application No. 61/893,978 is incorporated by reference herein in its entirety.

BACKGROUND

This application relates generally to the field of reactors (e.g. flow tube reactors) for use in producing valuable products from input reactants. More specifically, this application relates to reactors configured to induce endothermic chemical reaction conditions and including heating devices configured to influence (e.g., control) reaction temperatures to promote the desired formation of the products while minimizing unwanted thermal degradation of the products.

SUMMARY

One embodiment relates to a method for producing a usable product in a reactor. The method includes introducing a viscous mixture including usable product and unconverted reactant into a chamber of a housing through an inlet, where the mixture has a temperature greater than ambient temperature when introduced into the chamber. The method also includes heating the viscous mixture in the chamber using at least one of an induction heater, an exothermic reaction, a microwave heater, a radio frequency heater, an electrical resistance heater, a laser heater, a plasma heater, and a heated fluid. The method also includes converting at least a portion of the unconverted reactant to usable product, where at least a portion of the usable product is produced in the viscous mixture and transferring the viscous mixture including usable product from the housing through an outlet.

Another embodiment relates to a method for producing usable product in a reactor system. The method includes introducing a raw reactant into a chamber of a first reactor, heating the raw reactant in the chamber of the first reactor using a first amount of heat, and converting at least a portion of the raw reactant to usable product in a viscous mixture. The method also includes transferring the heated viscous mixture and any unreacted reactant through an outlet of the first reactor into a chamber of a second reactor, where the second reactor is provided in series with the first reactor, heating the viscous mixture in the chamber of the second reactor using a second amount of heat, converting at least a portion of any unreacted reactant into usable product in the viscous mixture, and removing the viscous mixture and usable product from the second reactor through an outlet of the second reactor. Each amount of heat may be generated by at least one of an induction heater, an exothermic reaction, a microwave heater, a radio frequency heater, an electrical resistance heater, a laser heater, a plasma heater, and a heated fluid.

Yet another embodiment relates to a method for producing usable product in a reactor system. The method includes introducing a first reactant into a first chamber of a first housing and heating the first reactant in the first chamber using a first heating device to produce heat via an exothermic reaction. The method also includes introducing the heat from the exothermic reaction and a second reactant into a second chamber of a second housing to heat the second reactant, wherein the second housing is provided in series with the first housing. The method also includes further heating the second reactant in the second chamber using a second heating device using at least one of an induction heater, a microwave heater, a radio frequency heater, an electrical resistance heater, a laser heater, a plasma heater, and a heated fluid; and converting at least a portion of the second reactant into usable product in a viscous mixture in the second chamber. The second reactant may be different than the first reactant.

BRIEF DESCRIPTION OF THE DRAWINGS

FIG. 5 is a cross-sectional view of a portion of a reactor, according to another exemplary embodiment.

FIG. 6 is a cross-sectional view of a portion of a reactor, according to another exemplary embodiment.

FIG. 7 is a schematic of a reactor, according to another exemplary embodiment.

DETAILED DESCRIPTION

Figure 1:
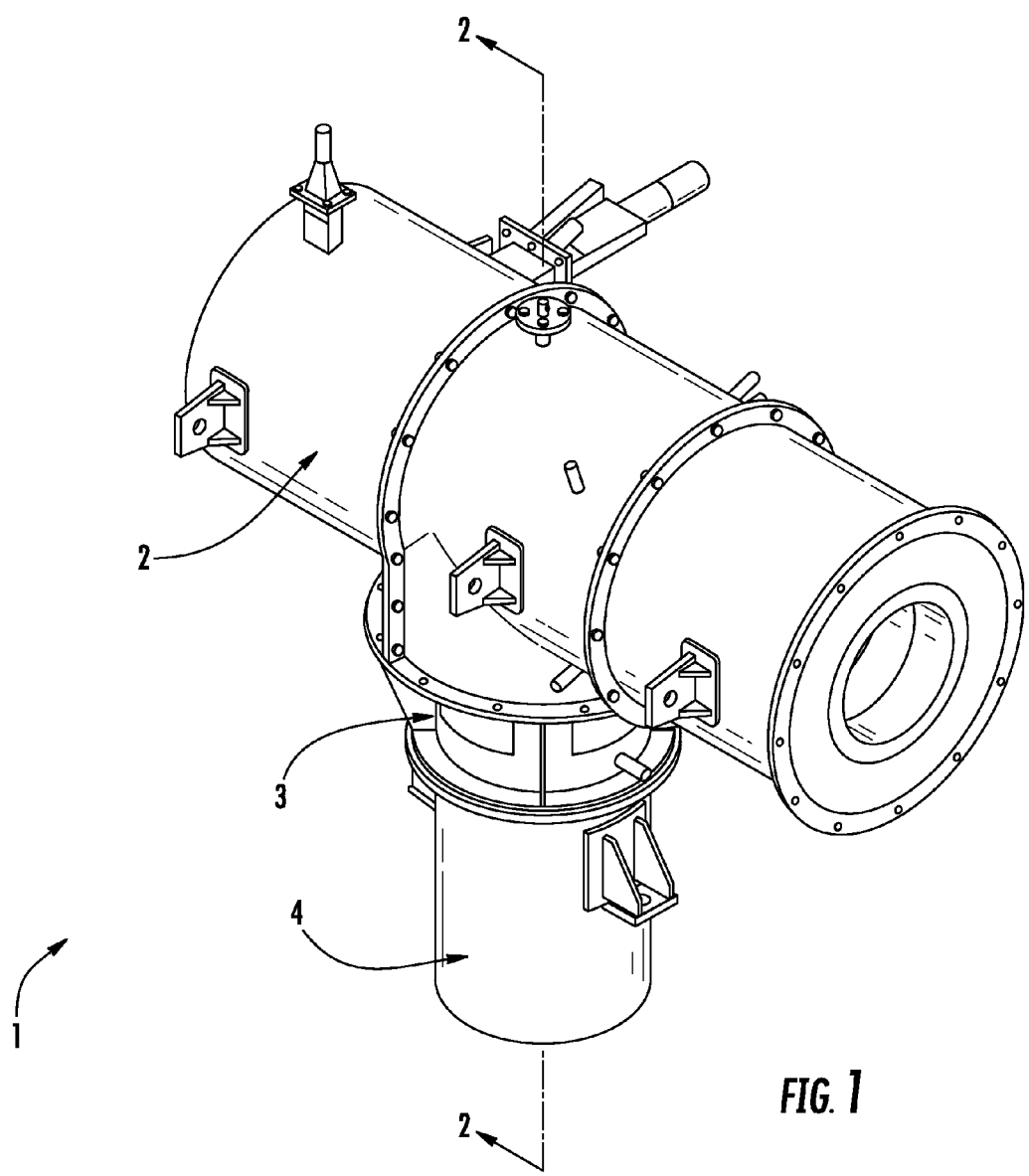
FIG. 1 is a perspective view of a reactor, according to an exemplary embodiment.

Referring generally to the Figures, disclosed herein are reactors (e.g., flow tube reactors) and reactor systems that may be used alone or as part of a larger assembly, and that are configured to react one or more input reactants to form a usable product. The usable product may then be recovered from the reactor and may be used in a secondary process. According to one exemplary embodiment, the reactor may use a coil (e.g., an induction coil) to heat the one or more reactants within a volume (e.g., chamber, combustion chamber, etc.) of the reactor to facilitate a reaction of the reactants. According to other embodiments, the reactor may be configured to utilize dielectric heating (e.g., microwave or radio frequency (RF) heating), a direct current passing through a conductive element, combustion, and/or heating fluids (either using convection or latent heat due to phase changes) to generate heat in the reactor volume.

As discussed herein, the usable products may be chemicals or materials (e.g., carbon-based chemicals) including, but not limited to, calcium carbide ($CaC_2$), lithium carbide ($Li_2C_2$), sodium carbide ($Na_2C_2$), potassium carbide ($K_2C_2$), and magnesium carbide ($Mg_2C_3$ or $MgC_2$). The improved reactor may advantageously allow for the production of such chemicals or materials using readily-available raw materials to produce chemicals for broad applicability.

The usable products may be produced in a reaction in which one or more reactants (including, e.g., carbon or a carbon-containing material) are consumed or converted in an endothermic reaction in which heat is added to facilitate the production of the usable products. For example, according to one exemplary embodiment, carbon or a carbon-containing material may be heated in the presence of calcium oxide (CaO) to produce $CaC_2$ and CO.

The reactor may include the introduction of heat to facilitate the reactions, through one or more of a variety of heating systems. Several of which will now be described.

According to a first exemplary embodiment, induction heating may be used to provide the heat input for the reaction. For example, induction heating may be used to heat an element (e.g., constituent, component, etc.) of the reactor assembly (e.g., the flow tube assembly), such as a conductive element (e.g., an encased graphite sleeve) that is provided in the flow tube assembly. The heat in the conductive element in turn acts to heat (e.g., by conduction, convection, or radiation) one or more reactants, such as, for example, in a viscous mixture (e.g., a liquid reaction media, a liquid melt flow, a liquid slag, a slag layer, a slag flow, etc.) that flows through the heated component of the reactor assembly (e.g., the conductive element). The induction heating may alternatively be configured to directly heat the viscous mixture, such as through an ultra-high frequency induction heater, thereby eliminating the need for a conductive element in the flow tube assembly.

The viscous mixture may include a liquid portion with solids (e.g., one or more reactants) intermingled with the liquid portion. The viscous mixture may contain solid particles (e.g., one or more unreacted reactants) entrained in the liquid portion. For example, a first portion of one or more reactants may react when heated to form the liquid portion, while a second portion of the reactant(s) may remain as solids within (or external to) the liquid portion. Thus, the viscous mixture may be a semi-liquid and semi-solid mixture having a viscosity, which may be higher than that of typical solid-free mixtures.

According to a second exemplary embodiment, microwave heating may be used to provide the heat input for the reaction. For example, microwave heating may be used to heat an element (e.g., constituent, component, etc.) of the flow tube assembly, such as a conductive element (e.g., an encased graphite sleeve) that is provided in the flow tube assembly. This in turn acts to heat (e.g., by conduction, convection, or radiation) a viscous mixture that flows through the heated component. The microwave heating may alternatively be configured to directly couple to the viscous mixture, such as through high power focused beams, thereby eliminating the need for a conductive element in the flow tube assembly.

According to a third exemplary embodiment, electrical resistance heating may be used to provide the heat input for the reaction. For example, the reactor may be configured to pass an electric current through an electrically conductive element (e.g., an encased graphite sleeve) provided in the flow tube assembly to induce electrical resistance heating of the element, which in turn heats up the viscous mixture flowing through the flow tube reactor. Also for example, the reactor may be configured to pass the electric current directly through the viscous mixture or melt flow.

According to a fourth exemplary embodiment, the heat may be generated through an exothermic reaction, such as combustion heating. Such an exothermic reaction can occur in an internally-fired system, where a portion of fuel is combusted within the same chamber in which the viscous mixture is formed. Alternatively, such an exothermic reaction can occur in an externally-fired system (e.g., a flow tube reactor) where the combustion zone is separated by a physical barrier (e.g., a thermally conductive wall) from the viscous mixture. For example, the reactor may be configured having first and second walls (e.g., tubes, pipes, etc.) defining two fluidly separated chambers, where the combustion and exothermic reaction is fired in one of the chambers of the flow tube reactor to heat one or more walls. In turn, the heat is transferred from the wall(s) to the viscous mixture flowing in the other chamber of the flow tube reactor. The reactor may be configured having a shell and tube arrangement where the first chamber is defined by an inner wall (e.g., inner tube, inner pipe, etc.) and the second chamber is defined by an outer wall (e.g., outer shell, outer pipe, etc.) and the inner wall. It is noted that other types of exothermic reactions may be utilized, such as, for example, hydrochlorination, in which hydrogen may be burned in a gaseous chlorine. The resulting exothermic reaction generates heat, which may be used within the various reactors disclosed herein.

According to a fifth exemplary embodiment, the heat may be generated by a laser. For example, the laser may be used to directly heat the viscous mixture. Alternatively, the laser may be used to heat an element (e.g., member, layer, etc.) of the reactor, such as a heating element, where the heat is then transferred (e.g., through conduction) to the viscous mixture.

According to a sixth exemplary embodiment, the heat may be generated by a plasma heater. For example, the plasma heater may be used to directly heat the viscous mixture. Alternatively, the plasma heater may be used to heat an element (e.g., member, layer, etc.) of the reactor, such as a heating element, where the heat is then transferred (e.g., through conduction) to the viscous mixture.

According to a seventh embodiment, the heat may be generated by a heated fluid. For example, the heated fluid may be used to directly heat the viscous mixture. Alternatively, the heated fluid may be used to heat an element (e.g., member, layer, etc.) of the reactor, such as a heating element, where the heat is then transferred (e.g., through conduction) to the viscous mixture.

After a portion of, or all of, the reactants are converted, the viscous mixture including the usable product (e.g., $CaC_2$) may be recovered from the reactor to be subsequently used, for example, in the production of acetylene or for any other desired use. Disclosed herein are exemplary systems configured to facilitate the production of the usable products, e.g., $CaC_2$.

According to an exemplary embodiment, the reactor assembly includes a reactor configured to produce a usable product. The reactor assembly may optionally include a recovery system configured to facilitate removal of the usable product from the reactor. It is noted that various examples of reactors disclosed herein may be used with any type of reactor assembly, even if, for example, not shown in combination therewith.

Figure 3:
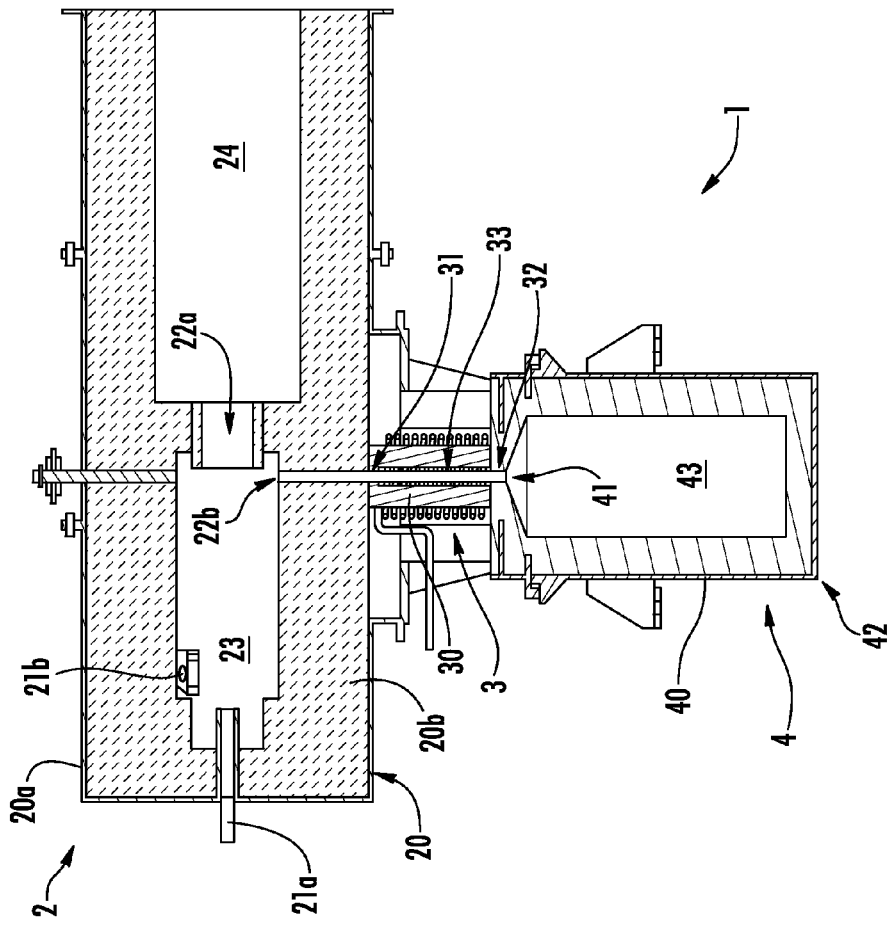
FIG. 3 is another cross-sectional view of the reactor of FIG. 1.
Figure 2:
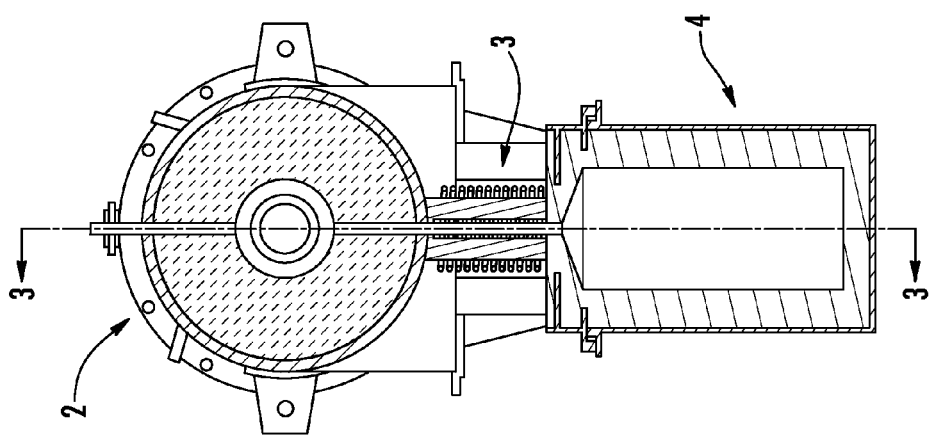
FIG. 2 is a cross-sectional view of the reactor of FIG. 1.

FIGS. 1-3 illustrate an exemplary embodiment of a reactor assembly 1 that includes a first reactor 2 (e.g., a primary reactor) and a second reactor 3 (e.g., secondary reactor) operatively coupled (e.g., in fluid communication) with the first reactor 2. For example, the first and second reactors 2, 3 may be configured in series, such that an output (e.g., a viscous mixture, a liquid reaction media, etc.) from the first reactor 2 enters the second reactor 3 for further heating.

The first reactor 2 includes a housing 20 (e.g., casing) that defines a chamber. As shown in FIG. 3, the housing 20 defines a first chamber 23 (e.g., combustion chamber) and a second chamber 24 (e.g., a post-combustion chamber). The first chamber 23 may be configured as the combustion chamber that is configured to combust reactants introduced therein to generate heat and form a viscous mixture to facilitate production of the usable product. The second chamber 24 may be configured, for example, to transfer heat and/or off-gases from the reactor 2 to a downstream process or device, such as a boiler, a heat exchanger, a reactor, or another suitable device. The housing 20 may include one or more than one layer. As shown in FIGS. 2 and 3, the housing 20 includes an outer layer 20a (e.g., a shell) and an inner layer 20b that defines the chambers therein. For example, the outer layer 20a may be structural and, therefore, made of a relatively strong material (e.g., steel). Also for example, the inner layer 20b of the housing 20 may be formed from one or more refractory materials, and may (optionally) include one or more than one layers of refractory materials. Thus, the one or more than one inner layer 20b made of refractory material may be configured having a higher temperature resistance relative to the outer layer 20a.

The first reactor 2 includes an inlet and an outlet. The inlet is configured to introduce at least one reactant into the first reactor 2, and the outlet is configured to transfer an output (e.g., usable product, viscous mixture, etc.) from the first reactor 2 to the second reactor 3. The housing 20 may include the inlet(s) and/or the outlet(s) integrally formed therewith, or the inlet(s) and/or the outlet(s) may be formed separately from the housing 20 and then coupled to the housing 20.

As shown in FIG. 3, the housing 20 (e.g., casing) includes a central axial inlet 21a (e.g., primary inlet, longitudinal inlet), a radial and/or a tangential inlet 21b (e.g., secondary inlet), a longitudinal outlet 22a, and a radial outlet 22b (e.g., transverse outlet). Both the central axial inlet 21a and tangential inlet 21b may be configured to introduce one or more reactants into the chamber 23, such as axially or tangentially, respectively, relative to the chamber. The radial inlet may introduce one or more reactants into the chamber in a radial direction relative to the axial direction. The longitudinal outlet 22a may be configured as an outlet for heat, such as to transfer the heat and off-gases generated by the reactions in the first chamber 23 to the second chamber 24. The radial outlet 22b may advantageously be disposed at a lower portion (e.g., along the bottom) of the first chamber 23 to allow the viscous mixture to flow from the first reactor 2 to the second reactor 3. The radial outlet 22b may also preferably be disposed in a rearward portion of the chamber 23 to increase the residence time of the viscous mixture in the first reactor 2. It is noted that the first reactor 2 may include any number of inlets and outlets.

The second reactor 3 is configured to regulate (e.g., monitor, control, etc.) the temperature of the viscous mixture transferred from the first reactor 2. For example, the second reactor 3 may be configured to selectively (e.g., variably) heat the viscous mixture to influence the flow characteristics (e.g., viscosity) of the viscous mixture and to continue the reactions occurring in the viscous mixture to generate additional usable product. Thus, the heat from the second reactor 3 may also induce further reactions within the viscous mixture to produce additional usable product. The second reactor 3 may be configured to utilize a coil (e.g., an induction coil), dielectric heating (e.g., microwave, radio-frequency or RF, etc.), direct current (e.g., passing through a conductive element), combustion, or heating fluids to heat the viscous mixture. Thus, the second reactor 3 may be configured as the other reactors disclosed herein, such as, for example any one of or a combination of the reactors (e.g., reactors 101, 220, 320, 420, 502, 601) to be discussed below.

The second reactor 3 may include a casing 30 that extends from a first end 31 (e.g., an inlet) to a second end 32 (e.g., an outlet). The casing 30 defines a chamber 33 through which the viscous mixture flows when heated to a temperature above a solidification temperature. The first end 31 may be in fluid communication with the outlet 22b of the first reactor 2. The second end 32 may be in fluid communication with a collection device, if provided, with another reactor, or with another device configured to store and/or process the usable product recovered from the second reactor 3. The second reactor 3 may be configured to heat the viscous mixture flowing between the first and second ends 31, 32, and the length between the ends may be tailored for different applications (e.g., configurations of reactors), such as to provide for an increased or decreased residence time of the viscous mixture.

Figure 12:
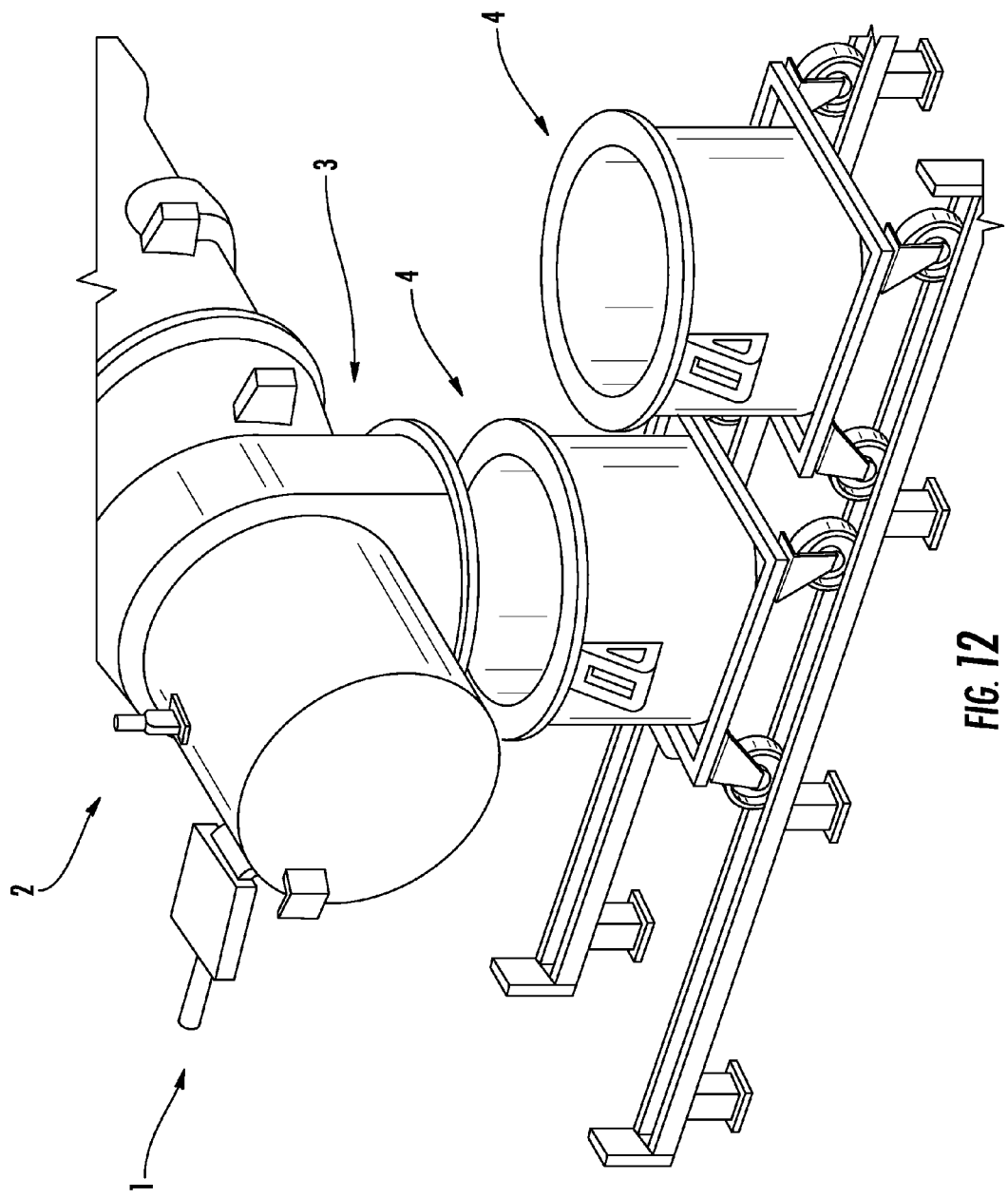
FIG. 12 is a perspective view of a conveyor system configured to move collection devices of the reactor, according to an exemplary embodiment.

The reactor assembly 1 may optionally include a collection device 4 (e.g., crucible, receptacle, etc.). The collection device 4, if provided, may be in fluid communication with the second end 32 of the reactor 3. As shown in FIG. 3, the collection device 4 includes a casing 40 (e.g., housing) having a first open end 41, which is configured to receive the viscous mixture from the reactor 3, and a second closed end 42. The casing 40 may be hollow to define a chamber 43 for storing the viscous mixture. The collection device 4 may be configured to be detachable from the second reactor 3 to allow the collection device 4 to be moved. As shown in FIG. 12, the collection device 4 may be movable via a conveyor including one or more than one rail 5.

The collection device 4 may also, for example, be configured to include one or more of the various heating elements/methods (e.g., an induction heater, an exothermic reaction, a microwave heater, a RF heater, an electrical resistance heater, a plasma heater, a heated fluid, etc.) described herein for use with the reactors.

Figure 4:
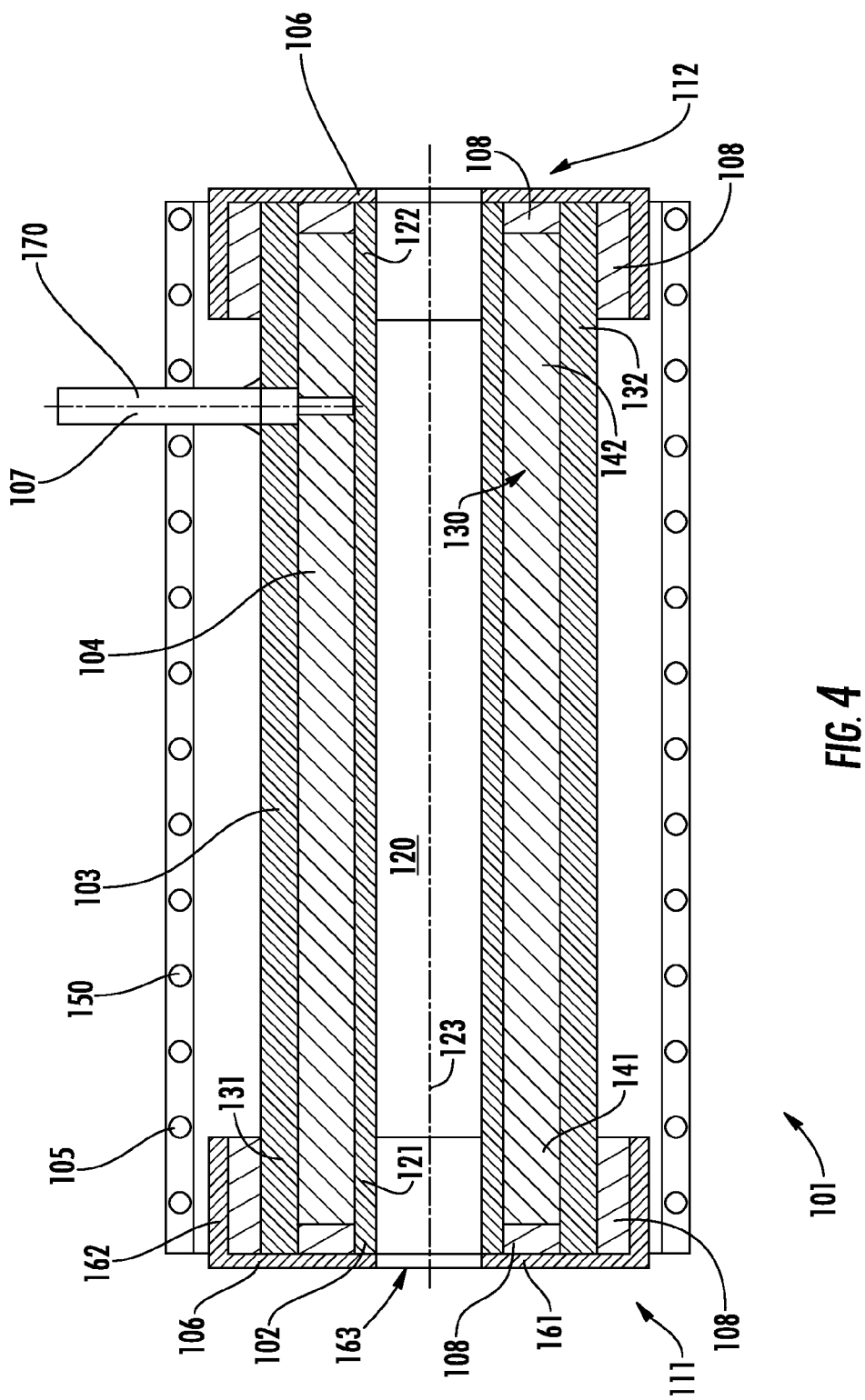
FIG. 4 is a cross-sectional view of a reactor, according to another exemplary embodiment.

FIG. 4 illustrates another exemplary embodiment of a reactor 101 (e.g., a flow tube reactor) that is configured to utilize induction heating to heat a viscous mixture within the reactor. The reactor 101 includes an inner pipe 102, an outer pipe 103, a sleeve 104 provided between the inner and outer pipes, and a coil 105 provided around at least a portion of the outer pipe 103. As shown, the reactor 101 may be generally cylindrical in shape and may extend in a horizontal direction from a first end 111 to a second end 112. According to other embodiments, the reactor 101 may extend in a vertical direction or in an oblique direction. A reactor aligned at a downwardly sloping oblique angle (e.g., from the input end to the output end) or vertically (e.g., with the input end at the top and the output end at the bottom) may advantageously eliminate the need for a moving device (e.g., pump) to help move the viscous mixture, since gravity will influence the flow of the viscous mixture through the reactor 101.

The first end 111 may be configured as an inlet to the reactor 101 to allow one or more than one reactant to be introduced into the reactor. The second end 112 may be configured as an outlet from the reactor 101, from which one or more than one usable product can be removed from the reactor, such as through or to a recovery system. Heat and/or off-gas may also be removed from the second end 112 of the reactor 101. However, the ends may be switched, such that the second end 112 is the inlet and the first end 111 is the outlet.

The inner pipe 102 may be configured as a hollow member that defines a chamber 120 therein, such as, to facilitate the heating of the one or more than one reactant and/or the viscous mixture flowing through the chamber 120. As shown, the inner pipe 102 is a generally cylindrical shaped pipe (e.g. tube, etc.) extending from a first end 121 to a second end 122, and having a central axis 123. The inner pipe 102 may be configured having a relatively large aspect ratio (i.e., the ratio of its length to diameter). The aspect ratio may be tailored to allow enough time for a predetermined amount of heat to be generated and to provide enough residence time of the viscous mixture in the flow tube to convert to product. Preferably, the aspect ratio is between 0.5:1 and 20:1. More preferably, the aspect ratio is between 1:1 and 10:1. However, these values for the aspect ratio are not limiting and the reactors disclosed herein may have aspect ratios that are outside of these ranges.

The inner pipe 102 is made from a material that is capable of withstanding the relatively high temperatures in the chamber 120 and in the adjacent elements (e.g., the sleeve 104). For example, the inner pipe 102 may be made from a high alumina material (e.g., calcium aluminate cement), a zirconium oxide, a silica oxide, or other suitable materials. The thickness of the inner pipe 102 may be tailored to the specific application.

The outer pipe 103 is configured as a hollow cylindrical member that defines a chamber 130 therein, such as to receive another element (e.g., constituent, component, etc.) of the reactor 101. For example, the sleeve 104 may be disposed in the chamber 130, as shown in FIG. 4. Also shown, the outer pipe 103 extends from a first end 131 to a second end 132. The outer pipe 103 has a size (e.g., length, thickness, aspect ratio, etc.) that may be substantially the same as or may differ from the aspect ratio of the inner pipe 102. For example, the inner and outer pipes 102, 103 may have substantially similar lengths, such as shown in FIG. 4, or the length of the inner pipe 102 may be longer than the length of the outer pipe 103, such as, if the inner pipe 102 is configured to extend beyond the cap 106 (if provided). The outer pipe 103 is made from a material that is capable of withstanding the relatively high temperatures. For example, the outer pipe 103 may be made from a high alumina material (e.g., calcium aluminate cement), a zirconium oxide, a silica oxide, or other suitable materials. The thickness of the outer pipe 103 may be tailored to the specific application.

As shown in FIG. 4, the outer pipe 103 has a diameter (e.g., an inner diameter) that is larger than a diameter (e.g., an outer diameter) of the inner pipe 102 so as to separate the walls of the pipes to allow receipt of the sleeve 104. therebetween For example, an inside surface of the outer pipe 103 may be spaced apart from an outside surface of the inner pipe 102 by a distance that is equal to or greater than the thickness of the sleeve 104.

The sleeve 104 is configured as a hollow cylindrical member extending between a first end 141 and a second end 142. The sleeve 104 is provided between the inner and outer pipes, and may be arranged concentric to the inner pipe 102 and/or the outer pipe 103. For example, the sleeve 104 may have a longitudinal axis that is co-axial to (e.g., co-linear with) the central axis 123. The sleeve 104 may be arranged to be in contact with or spaced apart from the inner pipe 102 and/or the outer pipe 103. For example, an inside surface of the sleeve 104 may be in contact with (e.g., abut) the outside surface of the inner pipe 102, while an outside surface of the sleeve 104 may be in contact with the inside surface of the outer pipe 103. Alternatively, the inside surface of the sleeve 104 may be spaced apart from the outside surface of the inner pipe 102, and/or the outside surface of the sleeve 104 may be spaced apart from the inside surface of the outer pipe 103.

According to an exemplary embodiment, the sleeve 104 is made from an electrically conductive material such as graphite, a conductive ceramic material, or other suitable materials. The electrically conductive sleeve 104 is configured to be heated, such as by the coil 105 through an induced oscillating magnetic field. For example, eddy currents may be generated in the sleeve 104 from the oscillating magnetic field therein, where resistance leads to Joule heating of the sleeve 104. The heat generated by the sleeve 104 may then be transferred to the inner pipe 102, such as through conduction, to increase the temperature in the chamber 120. The heat in the chamber 120 may promote chemical conversions of the one or more reactants in the chamber 120 or to continue the endothermic reactions to produce usable product.

The coil 105 is configured to induce an oscillating magnetic field when an electrical current is passed through the coil 105. For example, the coil 105 may be configured to heat the sleeve 104 by electromagnetic induction when current is passed through the coil 105. The coil 105 may include one or more than one electrically conductive elements 150. As shown in FIG. 4, the coil 105 includes a single electrically conductive element 150 having a generally circular cross-sectional shape arranged in a helical configuration that winds around the sleeve 104. The coil 105 may include more than one electrically conductive element and/or may have other suitable shapes. For example, the coil 105 may include two (or more) helically-shaped conductive elements, which may wind around the sleeve 104 in a congruent manner. The coil 105 is made from a material that is electrically conductive, such as copper, aluminum, or any other suitable material. It is noted that the configuration (e.g., size, shape) of the coil may be tailored to the reactor, which may be different than disclosed herein.

The reactor 101 may include a power supply (e.g., a power source) that is configured to provide (e.g., supply) electrical power (e.g., electrical current). The power supply may provide electrical power to the coil 105. The power supply provides a high-frequency alternating current (AC).

The reactor 101 may optionally include a cap 106, which may be configured to help couple other members (e.g., elements, components, etc.) of the reactor 101 together. As shown in FIG. 4, the reactor includes a cap 106 provided on each end of the reactor 101 to couple the inner pipe 102, the outer pipe 103, and the sleeve 104 together. Each cap 106 may include a base 161 and a leg 162 extending away from the base 161. For example, the base 161 may be circular in shape, and the leg 162 may be cylindrical in shape, such that the cap 106 has a generally C-shaped or U-shaped cross-section. Each cap 106 may include an opening 163 (e.g., a hole, an aperture, a bore, etc.), which may be aligned with the chamber 120 of the inner pipe 102. Accordingly, the one or more reactant and/or the viscous mixture may be introduced into the chamber 120 of the reactor 101 through the opening 163 in the cap 106.

Each cap 106 may be made from a material that is capable of withstanding the relatively high temperatures in the reactor 101. For example, each cap 106 may be made from a high alumina material (e.g., calcium aluminate cement), a zirconium oxide, a silica oxide, or other suitable materials. The thickness of each cap 106 may be tailored to the specific application.

According to an exemplary embodiment, one cap 106 is provided on each of the two ends of the reactor 101, such that the first end 121 of the inner pipe 102 and/or the first end 131 of the outer pipe 103 abuts an inner surface of one cap 106, and the second end 122 of the inner pipe 102 and/or the second end 132 of the outer pipe 103 abuts an inner surface of the other cap 106. The leg 162 may be configured to surround at least a portion of the outer pipe 103 and/or the inner pipe 102. For example, the leg 162 may be provided adjacent to the outside surface of the outer pipe 103. It is noted that the material for the cap 106 on one side may be different than the material of the cap on the other side of the reactor 101. Similarly, the material of the features (e.g., the leg 162) of the cap 106 may be different than the other features of that cap and/or the features of the cap on the other side of the reactor 101.

According to one embodiment, the leg 162 may be configured to abut the outer pipe 103, such as with the inside surface of the leg 162 abutting the outside surface of the outer pipe 103. According to another embodiment, the leg 162 is configured to be offset from the outer pipe 103, with a gap provided between the inside surface of the leg 162 and the outside surface of the outer pipe 103. The gap may be configured to receive a coupling material 108. For example, the coupling material 108 may be a high temperature mortar or cement that couples the cap 106 to the outer pipe 103. The coupling material 108 include high alumina material (e.g., a calcium aluminate cement), a zirconium oxide, a silica oxide, or other suitable materials that can be used in mortar or cement and withstand relatively high temperatures. The coupling material 108 may also advantageously be configured to not interact (e.g., react) with the one or more than one reactants and/or the product being produced by the reactor.

The reactor 101 may include additional locations having coupling material 108 configured to couple two or more members of the reactor 101 together. For example, coupling material 108 may be used to couple the sleeve 104 in place. As shown in FIG. 4, there is a second gap provided between each end of the sleeve 104 and the respective cap 106, and also between the inner and outer pipes. The second gap may be generally annular in shape, and configured to receive the coupling material 108 to couple the sleeve 104 to the inner pipe 102, the outer pipe 103, and/or the cap 106. However, the configuration (e.g., size, shape, etc.) of the second gap may be tailored based on the overall configuration of the reactor 101. It is noted that the coupling material 108 can be replaced with other structural elements. For example, the reactor may be configured having an outer housing that is configured to interconnect one or more of the elements of the reactor. However, a cement or mortar coupling material 108 may advantageously fill gaps (e.g., cracks) in the reactor, such as between two or more components of the reactor, that form during assembly or manufacture of the elements and/or the reactor, to seal the reactor. Further, the viscous mixture may also be configured to fill gaps in the reactor upon cooling to self-seal the reactor.

The reactor 101 may optionally include a support that is configured to secure the coil 105 in place to another component of the reactor 101. For example, the support may be in the form of a bracket or bracket assembly that is configured to secure (e.g., attach, couple, etc.) a section of the coil 105 to the outer pipe 103 and/or the cap 106 of the reactor 101. The support may also be part of a frame structure, which may support the reactor 101 and/or be configured to facilitate coupling of the reactor 101 to another structure.

The reactor 101 may optionally include a regulator, which may be configured to regulate (e.g., monitor, control, influence, etc.) a condition (e.g., parameter) of the reactor 101. As shown in FIG. 4, the regulator 107 is configured to control the pressure of the chamber 130 of the reactor 101 that houses the sleeve 104. For example, the chamber 130 may be a sealed chamber, and the regulator 107 may maintain a positive pressure (e.g., a relatively small positive pressure compared to atmospheric pressure) to prohibit air from entering the chamber 130. This arrangement may advantageously prolong the life of the reactor 101, and in particular for the embodiments of the reactors that utilize a material, which oxidizes, for the sleeve 104. For example, the regulator 107 may help prolong the life of the graphite sleeve 104 by preventing oxygen (e.g., in the air), which could damage the graphite sleeve 104 through oxidation, from entering the chamber 130 due to the pressure difference.

The regulator 107 may include an input tube 170 that is configured pass through the outer pipe 103 and into the chamber 130 housing the sleeve 104. The input tube 170 may pass into the sleeve 104. As shown in FIG. 4, the input tube 170 may pass between two adjacent spirals of the helical coil 105 and pass through the outer pipe 103 into the sleeve 104. The regulator 107 may also be configured to introduce a material (e.g., a gas) into the chamber 130 to influence a condition of the reactor. For example, an inert gas (e.g., nitrogen) may be introduced into the chamber 130 through the input tube 170 to further prolong the life of the sleeve 104, such as by preventing oxidation of the conductive material (e.g., of the sleeve). The regulator 107 may include more than one input tube, which may be configured similarly or differently compared to the input tube 170.

The reactor 101 is configured to heat the one or more than one reactant and/or the viscous mixture to produce a usable product, which can be recovered from the reactor for later use. The reactant(s) may be introduced into the input end of the chamber 120 of the reactor 101, whereby the reactant(s) and/or the viscous mixture may be heated to a relatively high temperature (e.g., greater than 1500° C.) in the chamber 120 to induce reaction of the material therein. An electric current may be passed through the coil 105 to generate a magnetic field that induces eddy currents that heat the sleeve 104. The heat generated in the sleeve 104 then passes through the inner pipe 102, such as through thermal conductance (i.e., conductive heat transfer), into the chamber 120 to heat the reactants and/or the viscous mixture thereby producing a usable product.

For example, carbon and calcium oxide (CaO) may be introduced as reactants into the reactor 101, wherein the heat produced in the graphite from the induction field may be used to convert the carbon and CaO into $CaC_2$. The carbon and CaO may be introduced in a viscous mixture that is capable of flowing through the flow tube reactor. According to an exemplary embodiment, the reactor 101 is a standalone reactor that is configured to generate the heat to induce the reaction of the reactants. In other words, the reactor 101 may serve as the primary reactor (e.g., heater), such as where oxygen (e.g., air) is introduced along with the reactants to promote a reaction to produce the high temperatures to facilitate an endothermic reaction including the CaO to produce $CaC_2$.

According to another exemplary embodiment, the reactor 101 is part of a reactor assembly, such as where the reactor 101 is a secondary reactor that is positioned in series behind a primary reactor (e.g., a combustor). For example, the primary combustor may convert a first portion of the reactants, which may produce a portion of the usable product(s), and the reactor 101 may receive the material, including some unburned carbon and CaO, where the reactor 101 may convert some or all of the unburned reactants into usable product(s). For example, the unreacted reactants and usable products may exit the primary reactor within a viscous mixture, and the viscous mixture may enter the chamber 120 of the reactor 101 through an inlet, where the heat supplied by the reactor 101 continues to convert the unreacted reactants into usable product as the viscous mixture moves through the chamber 120 to the exit (e.g., outlet) of the reactor 101. Thus, the reactor 101 may be configured to post treat the viscous mixture to further increase the efficiency of the production of the usable product by converting additional amounts of unreacted reactants to product.

According to another exemplary embodiment, the reactor 101 may be configured as described above, except that the coil 105 may be replaced with a set of electrodes that are coupled directly to the sleeve 104 to pass an electric current directly through the sleeve 104 via the electrodes. The current passing through the sleeve 104 generates heat through electrical resistance, where the heat may be conducted through the inner pipe 102 to the chamber 120 to heat the viscous mixture therein.

FIG. 5 illustrates another exemplary embodiment of a flow tube reactor 220 using induction heating to influence the temperature of the system, such as the temperature of viscous mixture in the system. As shown, the reactor 220 includes a casing having an inner layer 224 having an inlet 221 and an outlet 222 disposed on opposing ends of the casing. The inner layer 224 may be configured to define a passage 223 through which the reactants and/or the viscous mixture, which may include both reactants and usable product, flow upon entering the inlet 221 of the reactor 220. The usable product (e.g., in the viscous mixture) may exit the system through the outlet 222 or may be transferred to a receptor or other suitable device.

As shown, the reactor 220 includes a heating element 225 disposed around the inner layer 224. The heating element 225 may be configured to abut the inner layer 224 or may be offset from the inner layer 224, such that a gap is provided between an inside surface of the heating element 225 and an outside surface of the inner layer 224. According to an exemplary embodiment, the heating element 225 is made from an electrically conductive material that is configured having a shape (e.g., a cylindrical shape) that receives the inner layer 224 therein. The reactor 220 may include one or more outer layers provided outside of and around the heating element 225.

The reactor 220 also includes a power source 226 in electrical connection with the heating element 225. The power source 226 is configured to produce an electric current (e.g., DC or AC) that passes through the heating element 225 via electrodes to generate heat that is transferred to the viscous mixture through the inner layer 224. The amount of electric power from the power source can be varied (e.g., amperes, voltage), such as to change the amount of heat produced by the electrical heating element 225.

FIG. 6 illustrates another exemplary embodiment of a reactor 320 using induction heating to influence the temperature of the system. As shown, the reactor 320 includes a casing 324 extending from a first end 321 to a second end 322. The casing 324 may be configured as a hollow member, such as to provide a chamber in which the reactants, viscous mixture, and/or usable product flow through the casing 324. The reactor 320 also includes an electrically conductive element 325 and a power source 326 electrically connected to the electrically conductive element 325. As shown, the electrically conductive element 325 is configured as a coil, such that as an alternating current (AC) passes through the electrically conductive element 325 an alternating magnetic field is formed that induces eddy current flow in the casing 324. The eddy current flow generates the heat to induce reaction of the reactants and/or a chemical reaction of the material in the viscous mixture to produce usable product. The electrically conductive element 325 may be made of copper or any other suitable electrically conductive material.

According to another exemplary embodiment, a reactor may be configured to use dielectric heating to influence the temperature of the reactants and/or the viscous mixture to produce a usable product. For example, microwave heating may be used to heat the reactants and/or the viscous mixture. FIG. 7 illustrates an exemplary embodiment of a reactor 420 configured to utilize microwave heating to influence the temperature of the system, such as the temperature in a chamber 423 defined by the casing 424 of the reactor 420, in order to heat the reactants and/or the viscous mixture. The reactor 420 includes an inlet 421 for receiving the reactants and/or the slag flow and an outlet 422 through which the slag flow, including the usable products, may exit the reactor to be recovered or transferred to a receptor for processing the usable products. The reactor 420 includes one or more than one microwave producing devices 426, where each device 426 produces microwaves 427 that are directed toward the chamber 423 to heat the reactants/slag layer in the chamber 423 through the casing of the system. The frequency of the microwaves 427 may be varied to change the amount of heat produced.

According to another exemplary embodiment, the reactor 420 may use another form of dielectric heating, such as RF (radio frequency) heating, to heat the reactants and/or the viscous mixture. According to still other exemplary embodiments, the reactor may utilize more than one type of dielectric heating, such as by utilizing microwave heating in combination with RF heating. Additionally, it is noted that the different heating methods may be used in combination. For example, a reactor may be configured to utilize both dielectric heating in combination with induction, resistance, and/or combustion heating.

The reactors disclosed herein may utilize the heating systems and methods (e.g., induction, electric resistance, microwave, combustion, laser, etc.) to influence the flow the viscous mixture through the reactor. For example, the heating may be controlled (e.g., monitored, regulated, etc.), such as through a sensor to control the temperature that the viscous mixture is exposed to in the reactor. The reactor may then increase or decrease the temperature accordingly. For example, the reactor may increase the temperature to prohibit the viscous mixture from solidifying in the reactor, or may decrease the temperature to solidify (e.g., freeze) the viscous mixture in the reactor. For amorphous material, a temperature may be chosen to set the viscosity as to control the flow rate of viscous mixture in the reactor. In other words, a level of heat in each chamber (e.g., of the reactors disclosed herein) is adjustable when heating the viscous mixture to control a flow (e.g., flow rate, velocity, etc.) of the viscous mixture through the reactor. The flow of the viscous mixture increases when the level of heat is increased, and the flow of the viscous mixture decreases when the level of heat is decreased. The viscous mixture is configured to solidify when the level of heat is decreased below a solidifying threshold.

Figure 8:
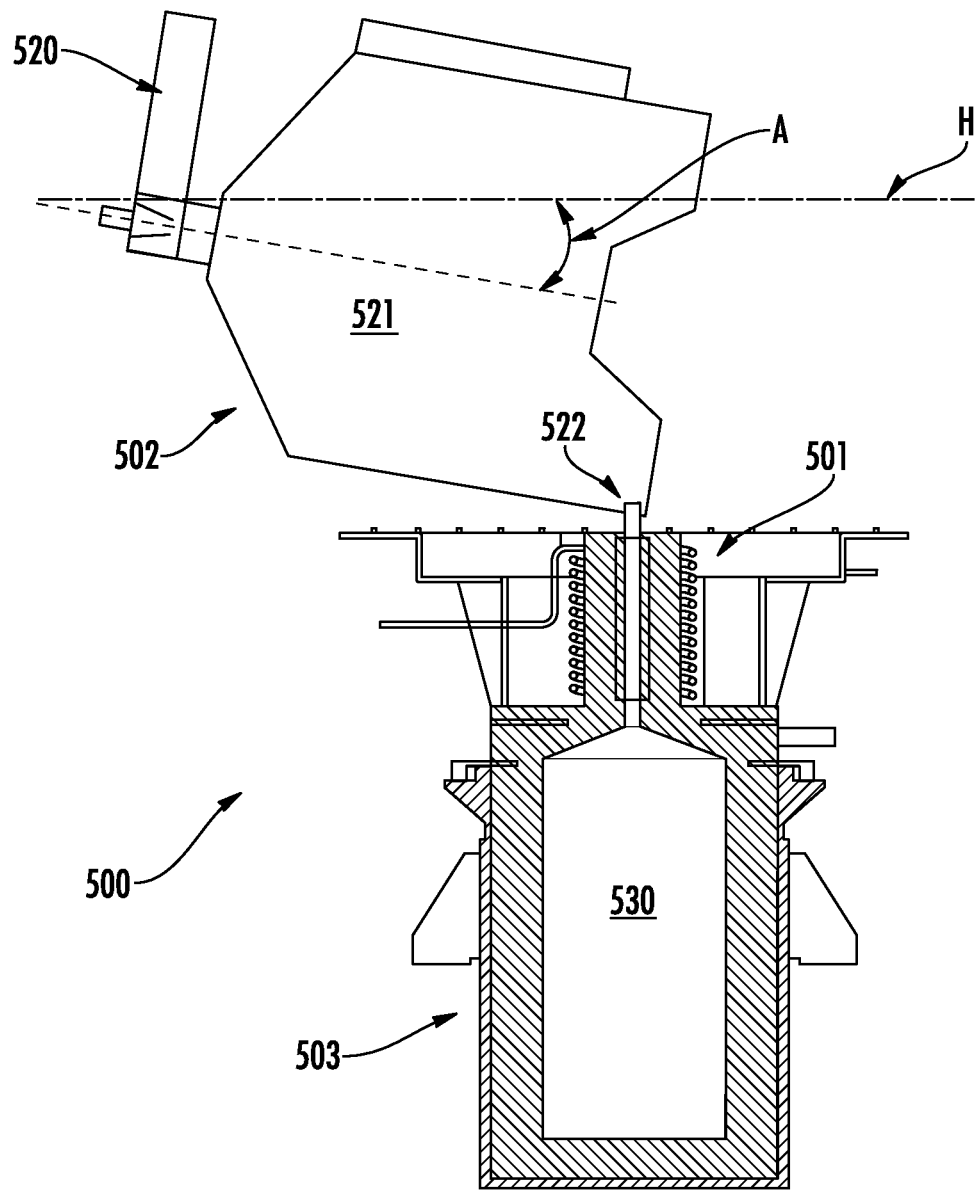
FIG. 8 is a cross-sectional view of yet another exemplary embodiment of a reactor, including both a primary reactor and a secondary reactor.

FIG. 8 illustrates an exemplary embodiment of a reactor assembly 500 including a reactor 501 configured as a secondary reactor that is arranged in series with a primary reactor 502. The primary reactor 502 may be configured to receive input reactants (e.g., carbon, CaO, oxygen, etc.), such as through one or more than one input 520, where the reactants are combusted within a chamber 521 of the primary reactor 502 to produce heat and a flow of viscous mixture. The viscous mixture may be transferred from the primary reactor 502 through an outlet 522 to the secondary reactor 501 for further processing.

The primary reactor 502 may have any suitable configuration. For example, the primary reactor 502 may be a cyclone reactor configured to combust the reactants in the combustion chamber 521 having relatively high temperatures (e.g., greater than 1500° C.). The primary reactor 502 may convert a first portion of the reactants into product contained within the viscous mixture while generating heat.

As shown, the secondary reactor 501 is configured substantially similar to the flow tube reactor 1 disclosed herein. However, the secondary reactor 501 may be configured as any reactor disclosed herein and is not limited to the flow tube reactor 1. The reactor assembly 500 may optionally include a collection device 503 (e.g., crucible), which may be configured substantially similar to the collection device 4 disclosed herein. The collection device 503 may include a chamber 530 that is configured to receive and hold the viscous mixture therein. The chamber 530 may be in fluid communication with an outlet of the secondary reactor 501. The collection device 503 may be configured to be detachable from the secondary reactor 501, such as to allow movement of the collection device 503.

A portion of or all of the reactor assembly may be aligned having an angle of inclination A, such as relative to horizontal H. As shown in FIG. 8, only the primary reactor 502 of the reactor assembly 500 is configured as an angle of inclination A relative to horizontal H. In other words, the secondary reactor 501 and the collection device 503 may be aligned vertically. The angle of inclination A of the primary reactor 502 may be configured at an angle between 0 and 90 degrees, which may be tailored to balance the flow rate and the residence time of the viscous mixture.

The viscous mixture and/or the unreacted reactants may be transferred to the secondary reactor 501, wherein additional product is produced, such as through the continued reaction of the unreacted reactants by additional heat that is generated by the secondary reactor 501 and input into the viscous mixture. The additional heat generated by the secondary reactor 501 may further increase the efficiency of the reactor assembly 500 by converting additional amounts of unreacted material (e.g., in the viscous mixture) to usable product.

Figure 10:
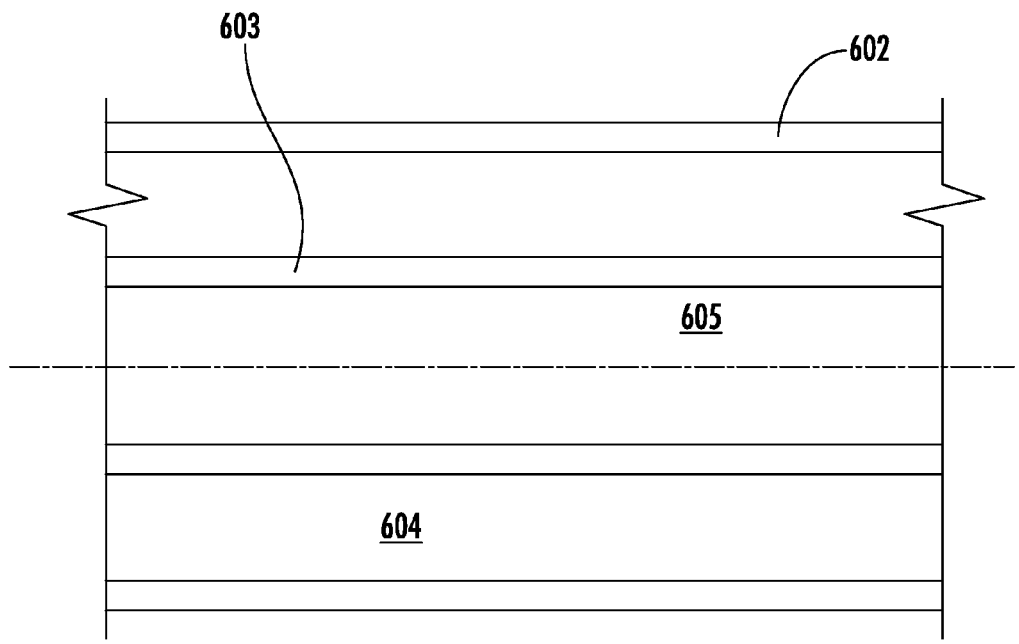
FIG. 10 is a cross-sectional view of a portion of a reactor, according to an exemplary embodiment.
Figure 11:
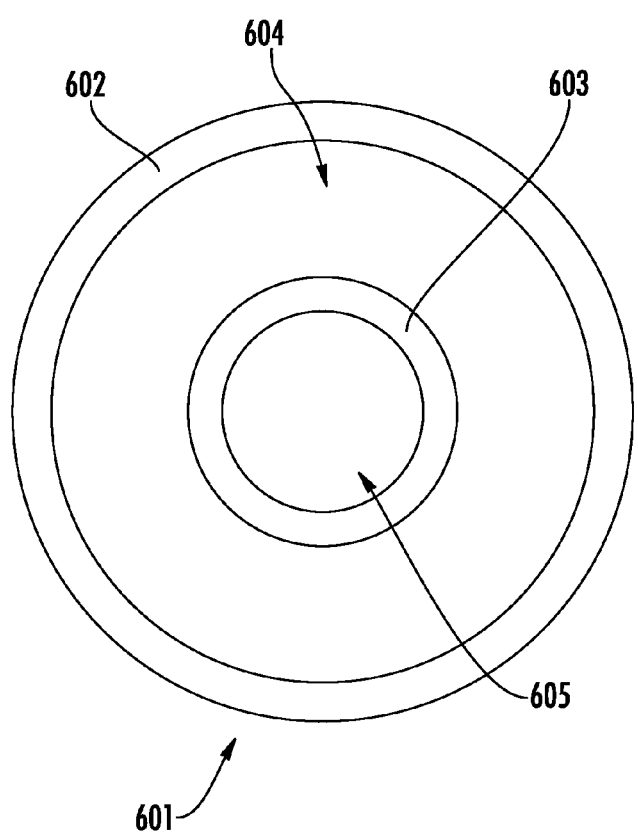
FIG. 11 is a side view of the portion of the reactor of FIG. 10.

FIGS. 10 and 11 illustrate a portion of another exemplary embodiment of a flow tube reactor 601 configured having a shell and tube arrangement. As shown, the reactor 601 includes a tube 603 (e.g., an inner tube, an inner wall, etc.) and a shell 602 (e.g., an outer tube, an outer wall, etc.) that are offset from one another forming a first chamber 604 (e.g., cavity) between the tube 603 and shell 602. The tube 603 may be hollow to form a second chamber 605 (e.g., cavity) within the tube 603. The reactor 601 may be configured having more than one tube 603 contained in the shell 602. For example, the reactor 601 may include a plurality of tubes 603, which be arranged concentrically, radially, or may have any suitable configuration within the shell 602.

According to one exemplary embodiment, the first chamber 604 is configured as a combustion chamber, wherein reactants are introduced and combusted during a first reaction to generate heat. The heat is then transferred inwardly through a wall of the tube 603, such as through conduction, to heat the second chamber 605. The second chamber 605 may include a viscous mixture flowing therethrough, where the heat induces a second reaction to convert the viscous mixture into a product, such as, for example $CaC_2$.

According to another exemplary embodiment, the second chamber 605 is configured as a combustion chamber, wherein reactants are introduced and combusted during a first reaction to generate heat. The heat is then transferred outwardly through the wall of the tube 603, such as through conduction, to heat the first chamber 604. The first chamber 604 may include a viscous mixture flowing therethrough, where the heat induces a second reaction to convert the viscous mixture into a product, such as, for example $CaC_2$.

The reactors disclosed herein may also be configured to utilize externally heated fluid that is passed through the reactor. For example, the flow tube reactor 601 may be configured such that externally heated fluid is passed through at least one of the chambers (e.g., one of the first chamber 604 and the second chamber 605), where the heat is transferred inwardly and/or outwardly in the reactor to heat a viscous mixture flowing through another chamber of the reactor 601 (e.g., the other of the first chamber 604 and the second chamber 605).

It is noted that the shell and tube arrangement can be used with other types of flow tube reactors described herein, such as, for example, the induction heated reactors, the microwave heated reactors, and/or the electrical resistance reactors. In other words, the other reactors disclosed herein may be configured having a shell and tube configuration.

Figure 9:
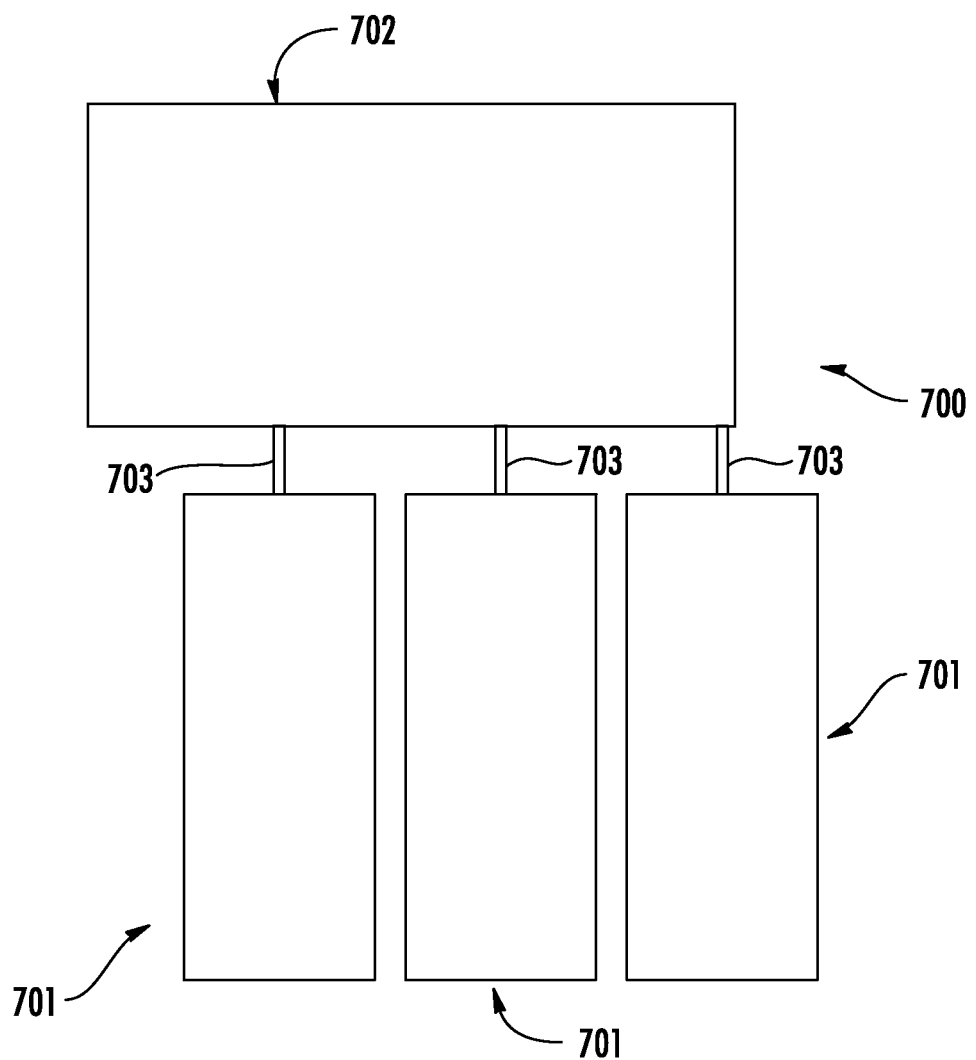
FIG. 9 is a side view of yet another exemplary embodiment of a reactor including a primary reactor and a plurality of secondary reactors.

It is also noted that a reactor system may be configured including a plurality of first reactors and/or a plurality of second reactors. As shown in FIG. 9, the reactor system 700 includes a single primary reactor 702 that is fluidly connected to three second reactors 701. It is noted that the reactor system 700 may be configured having any number of secondary reactors 701. Each secondary reactor 701 is configured in parallel to the other secondary reactors 701 and in series with the primary reactor 702. The primary reactor 702 may be configured according to any other reactor disclosed herein. The primary reactor 702 may include a plurality of outlets (e.g., three outlets as shown), where each outlet is fluidly connected, either directly or indirectly through another element (e.g., a pipe), to an inlet of one secondary reactor 701. Each secondary reactor 701 may be configured according to any other reactor disclosed herein. The reactor system 700 may include a transfer pipe 703 connecting one outlet of the primary reactor 702 to an inlet of the secondary reactor 701. Each transfer pipe 703 may be variably (e.g., adjustably) heated, such as by a heating device disclosed herein, to control the flow of the viscous mixture from the primary reactor 702 to the secondary reactor 701. The variably heated transfer pipe 703 may operate as a valve to control flow from the primary reactor 702 to the secondary reactor 701.

A reactor system may be configured having a plurality of primary reactors and one or more than one single secondary reactor. Each primary reactor of the system may be configured in parallel with the other primary reactors and may be configured in series with the single secondary reactor. Each primary and secondary reactor may be configured according to any other reactor disclosed herein.

Figures 13, 14:
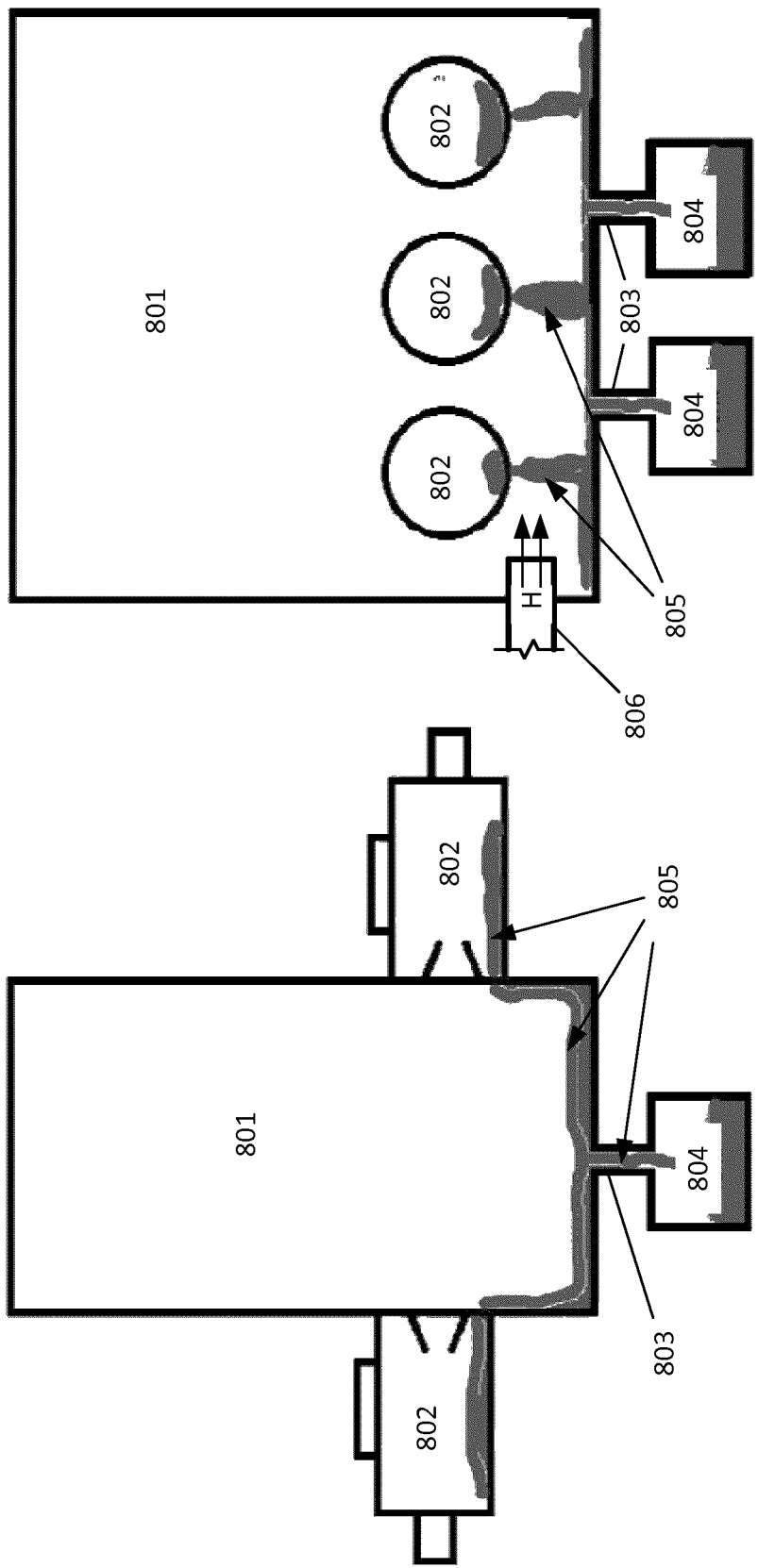
FIG. 13 is a side view of another exemplary embodiment of a reactor system.
FIG. 14 is a front view of the reactor system of FIG. 13.

FIGS. 13 and 14 illustrate another exemplary embodiment of a reactor system including a boiler 801, a plurality of primary reactors 802 (e.g., six primary reactors), and a plurality of secondary reactors 803 (e.g., two secondary reactors). For example, three primary reactors 802 may be connected to each of two opposing sides of the boiler 801, such that all of the primary reactors 802 are fluidly connected to a chamber of the boiler 801. Each primary reactor 802 may be configured according to any other reactor disclosed herein. Each primary reactor 802 may produce a viscous mixture 805 via heating one or more input reactants, and the viscous mixture may contain usable product and/or unreacted reactant(s). The viscous mixture 805 may be transferred to the boiler 801, such as, for example, along with heat and/or hot off gas to be utilized in the boiler 801. The viscous mixture 805 may be further heated while flowing through the boiler 801 by a boiler heating device 806 to further increase the temperature of and promote reactions in the viscous mixture 805. The boiler heating device 806 may be any number of suitable heating methods. For example, the heat H from the boiler heating device 806 may be produced in the boiler, such as by combusting fuels in the boiler, via one or more plasma torch injector, etc. Also for example, heat H may be produced external to the boiler 801 and then introduced into the boiler via a heat conveyor (e.g., pipe, tube, etc.). The viscous mixture 805 may then flow from the boiler 801, such as from a bottom portion thereof, into and through a secondary reactor 803. Each secondary reactor 803 may be configured according to any other reactor disclosed herein. Each secondary reactor 803 is configured to further heat the viscous mixture to promote additional reactions, e.g., of the unreacted reactant(s), creating more usable product.

The reactor system may optionally include a collection device 804 removably or detachably connected to an outlet end of each secondary reactor 803. Each collection device 804 may capture the viscous mixture passing from the respective secondary reactor 803.

The reactors and reactor systems disclosed herein may be configured to produce one or more usable products (e.g., $CaC_2$) through one or more of a variety of methods, several of which will now be described.

One exemplary method involves introducing a viscous mixture into a chamber of a housing of a reactor (which may be configured according to any reactor disclosed herein) through an inlet. The viscous mixture may include usable product and/or unconverted reactant. The viscous mixture may have an elevated temperature (i.e., a temperature that is greater than ambient temperature) when introduced into the chamber. The method further involves heating the viscous mixture in the chamber using a heating device. The heating device may include an induction heater, an exothermic reaction, a microwave heater, a radio frequency heater, an electrical resistance heater, a laser heater, a plasma heater, a heated fluid, or any combination thereof. Heat from the heating device converts at least a portion of the unconverted reactant to usable product through a reaction in the chamber. Some or all of the usable product produced in the chamber may form within the viscous mixture. Optionally, raw reactant may be introduced into the chamber along with the viscous mixture, and a portion of the raw reactant may react while entrained by gas flow (i.e., in flight in the chamber), while in the viscous mixture, or a combination thereof to form usable product. The method further involves transferring the viscous mixture including usable product from the housing through an outlet. Optionally, the viscous mixture may be transferred to a collection device, which may be detachable from the reactor. The collection device may further include a heating device configured to maintain a temperature of the viscous mixture by heating (either directly or indirectly) the viscous mixture. Optionally, the method may further involve removing off-gas from the reactor for use in a downstream device, such as a boiler.

Another exemplary method involves introducing a raw reactant into a chamber of a first reactor. The raw reactant may be introduced at ambient temperature or an elevated temperature. The raw reactant (e.g., CaO) may be introduced alone or in combination with other reactants (e.g., an oxygen containing material, a carbon containing material, etc.). The method further involves heating the raw reactant in the chamber of the first reactor using a first amount of heat produced by a heating device to convert via a reaction at least a portion of the raw reactant to usable product in a viscous mixture. The heated viscous mixture along with any unreacted reactant is transferred through an outlet of the first reactor into a chamber of a second reactor. Thus, the second reactor is provided in series with the first reactor. The method further involves heating the viscous mixture (and any unreacted reactant, if present) in the chamber of the second reactor using a second amount of heat produced by another heating device to convert at least a portion of any unreacted reactant into usable product in the viscous mixture. The viscous mixture and usable product may be removed from the second reactor through an outlet, such as to a collection device. Each heating device may include an induction heater, an exothermic reaction, a microwave heater, a radio frequency heater, an electrical resistance heater, a laser heater, a plasma heater, a heated fluid, or any combination thereof. Optionally, additional reactors similarly configured to the first reactor may be provided in parallel with the first reactor. The viscous mixture produced by each of the plurality of first reactors may be transferred to the same second reactor or may be transferred to a plurality of similarly configured second reactors. Optionally, one or more similarly configured third reactors may be provided in series with the second reactor(s) to further convert the viscous mixture from the second reactor(s) to produce additional usable product. Each third reactor may include a heating device. Optionally, hot off-gas may be transferred from one or more of the reactors to a downstream device, such as a boiler. Optionally, raw reactant may be introduced into one or more of the second and/or third reactors along with the viscous mixture. The raw reactant may be introduced a temperature that is less than the temperature of the viscous mixture. The raw reactant introduced may also be at an elevated temperature.

Yet another exemplary method involves introducing a first reactant into a first chamber of a first housing of a reactor of a reactor system. The first reactant may be introduced at ambient temperature or an elevated temperature. The first reactant may include various materials (e.g., a fuel source, a material used to form the usable product, a carbon containing material, an oxygen containing material, etc.). The method further involves heating the first reactant in the first chamber using a first heating device to produce heat via an exothermic reaction. For example, the first heating device may be a combustor and the first reactant may include a solid fuel, a liquid fuel, and/or a gaseous fuel. The method further involves introducing the heat from the exothermic reaction and a second reactant into a second chamber of a second housing to heat the second reactant, where the second housing is provided in series with the first housing. The second reactant may include various materials, which may be different than the various materials of the first reactant. For example, the second reactant may include a carbon source, a material including an element from group two of the periodic table of elements, a material including an element from group eleven of the periodic table of elements, and a material including an element from group twelve of the periodic table of elements, or any combination thereof. The method further involves heating the second reactant in the second chamber using a second heating device including an induction heater, a microwave heater, a radio frequency heater, an electrical resistance heater, a laser heater, a plasma heater, a heated fluid, or a combination thereof. The heat from the second heating device converts at least a portion of the second reactant into usable product in a viscous mixture in the second chamber. Optionally, a hot gas (e.g., an off-gas at an elevated temperature) may be introduced with the heat from the exothermic reaction into the second chamber to further heat the second reactant and/or entrain the second reactant in the hot gas. Optionally, the first reactant may produce a slag layer, which may be introduced into the second chamber along with the second reactant.

The reactors disclosed herein may provide several advantages, some of which are disclosed herein. First, the heat generated by the reactor may be used to induce reaction of the reactants in the reactor and/or reaction of a viscous mixture to produce a usable product.

Second, the reactants and/or the viscous mixture may exit the primary heating zone of the reactor or a primary reactor with a percentage (e.g., 10-20%) of unreacted reactants (e.g., unburned carbon). The heat generated may continue to induce reaction of the reactants downstream of the primary heating zone to further increase the efficiency of the system by increasing the amount of usable product produced. For example, the oscillating magnetic field in the system (e.g., the induction heating system) may result in localized heating of char particles, since the particles may include a level of electrical conductance from an element (e.g., graphite) in the particles. Thus, the oscillating magnetic field may selectively heat the localized particles to increase the extent of the reaction.

Third, the heat may be used to control the flow rate of the viscous mixture, such as to prohibit or promote solidification of the viscous mixture in the system or adjust the viscosity of the liquid flow. The temperature may be regulated to freeze/unfreeze the viscous mixture to control the flow from the reactor. For example, the heat generated may be increased to increase the temperature of the viscous mixture to a temperature that is equal to or greater than a melting point to unfreeze (e.g., liquefy) the viscous mixture to induce it to flow from an outlet of the reactor (e.g., of the recovery system). Also, for example, the heat generated may be decreased to decrease the temperature of viscous mixture to a temperature that is less than the melting point to freeze (e.g., solidify) the viscous mixture to induce it to stop flowing in and/or from the reactor. Thus, the reactor may not need a valve to meter the flow of the viscous mixture out an outlet, since the temperature may be increased or decreased to meter the flow or stop the flow. This may be particularly advantageous, since valves are generally not configured to withstand elevated temperatures, which may be necessary for the viscous mixture and/or the usable product to flow.

It should also be noted that the reactor may be configured to produce other useful products instead of or in addition to calcium carbide ($CaC_2$), including, but not necessarily limited to other carbides formed from the elements of groups one and two in the periodic table, such as lithium carbide ($Li_2C_2$), sodium carbide ($Na_2C_2$), potassium carbide ($K_2C_2$), and magnesium carbide ($Mg_2C_3$ or $MgC_2$). For example, the reactor may be configured to produce sodium carbide ($Na_2C_2$) and carbon monoxide from sodium oxide (or sodium carbonate) and carbon. Sodium carbide can be reacted with water to produce acetylene and sodium hydroxide. It is also believed that other acetylides may be formed within the reactor from the transition metal elements (e.g., group 11 of the periodic table), from the metal elements (e.g., group 12 of the periodic table), from lanthanoids (e.g., lanthanum (La), cerium (Ce), praseodymium (Pr), terbium (Tb)), steel, metallic silicon, aluminum, or other carbides. For example, copper carbide ($Cu_2C_2$) or zinc carbide ($ZnC_2$) may be able to be formed from within the reactor. Also, the reactor may be fed with bio-derived carbonaceous materials, such as biomass, biocoal, biochar, or a combination thereof, to produce bio-derived chemicals, such as bio-derived carbides. According to other exemplary embodiments, the systems and techniques discussed herein may be used to facilitate other reduction reactions, such as the reduction of iron oxides to elemental iron.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the reactors and recovery systems as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed, such as the casings of the reactors, may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element (e.g., inlet, burner, casing, etc.) disclosed in one embodiment may be incorporated or utilized with any other embodiment disclosed herein. In other words, it is contemplated that any element, component, feature, etc. shown in one embodiment may be incorporated into any other embodiment of this application. It is further contemplated that any method disclosed herein may be utilized within any embodiment, even if changes may be warranted to provide such a method.

What is claimed is:

1. A method for producing usable product in a reactor, the method comprising:
   introducing a viscous mixture comprising usable product and unconverted reactant into a chamber of a housing through an inlet, wherein the mixture has a temperature greater than ambient temperature when introduced into the chamber;
   heating the viscous mixture in the chamber using at least one of an induction heater, a microwave heater, a radio frequency heater, an electrical resistance heater, a laser heater, and a plasma heater;
   converting at least a portion of the unconverted reactant to usable product, wherein at least a portion of the usable product is produced in the viscous mixture; and
   transferring the viscous mixture including usable product from the housing through an outlet;
   wherein a level of heat in the chamber is adjustable when heating the viscous mixture to control a flow of the viscous mixture through the reactor, such that the flow of the viscous mixture increases when the level of heat is increased and the flow of the viscous mixture decreases when the level of heat is decreased, and wherein the usable product comprises a carbide.

2. The method of claim 1, wherein the carbide is selected from a group consisting of calcium carbide, lithium carbide, sodium carbide, potassium carbide, rubidium carbide, cesium carbide, francium carbide, beryllium carbide, strontium carbide, magnesium carbide, barium carbide, and radium carbide.

3. The method of claim 1, wherein the viscous mixture is configured to solidify when the level of heat is decreased below a solidifying threshold.

4. The method of claim 1, wherein the viscous mixture in the chamber is directly heated by heat from at least one of the microwave heater, the radio frequency heater, the laser heater, and the plasma heater.

5. The method of claim 1, wherein the housing further includes a conductive heating element provided around an inner layer of the housing, wherein the heating element is directly heated by the at least one of the induction heater, the microwave heater, the radio frequency heater, the electrical resistance heater, the laser heater, the plasma heater, and the heated gas, and wherein the viscous mixture in the chamber is indirectly heated by the heating element.

6. The method of claim 1, further comprising:
   introducing additional raw reactant into the chamber when introducing the viscous mixture, wherein at least a portion of the additional raw reactant is converted to usable product in the chamber.

7. The method of claim 1, further comprising:
   removing off gases from the reactor for use in a downstream device.

8. The method of claim 1, wherein transferring the viscous mixture including the usable product from the housing includes transferring the viscous mixture from the housing to a collection device, wherein the collection device is detachably coupled to the housing.

9. A method for producing usable product in a reactor, the method comprising:
   introducing a viscous mixture comprising usable product and unconverted reactant into a chamber of a housing through an inlet, wherein the mixture has a temperature greater than ambient temperature when introduced into the chamber;
   heating the viscous mixture in the chamber using at least one of an induction heater, an exothermic reaction, a microwave heater, a radio frequency heater, an electrical resistance heater, a laser heater, a plasma heater, and a heated fluid;
   converting at least a portion of the unconverted reactant to usable product, wherein at least a portion of the usable product is produced in the viscous mixture; and
   transferring the viscous mixture including usable product from the housing through an outlet;
   wherein a level of heat in the chamber is adjustable when heating the viscous mixture to control a flow of the viscous mixture through the reactor, such that the flow of the viscous mixture increases when the level of heat is increased and the flow of the viscous mixture decreases when the level of heat is decreased, and wherein the usable product comprises a carbide;
   wherein the viscous mixture in the chamber is directly heated by heat from at least one of the exothermic reaction, the microwave heater, the radio frequency heater, the laser heater, the plasma heater, the heated fluid, and the heated gas; and
   wherein the heat is produced by microwaves, radiowaves, or a combination of microwaves and radiowaves from a dielectric heater.

10. The method of claim 9, wherein the housing further includes a conductive heating element provided around an inner layer of the housing, wherein the heating element is directly heated by the microwaves, radio-waves, or a combination of microwaves and radio-waves from a dielectric heater, and wherein the viscous mixture in the chamber is indirectly heated by the heating element.

11. The method of claim 9, wherein the carbide is selected from a group consisting of calcium carbide, lithium carbide, sodium carbide, potassium carbide, rubidium carbide, cesium carbide, francium carbide, beryllium carbide, strontium carbide, magnesium carbide, barium carbide, and radium carbide.

12. The method of claim 9, wherein the viscous mixture is configured to solidify when the level of heat is decreased below a solidifying threshold.

13. The method of claim 9, wherein the housing further includes a conductive heating element provided around an inner layer of the housing, wherein the heating element is directly heated by the at least one of the induction heater, the electrical resistance heater, the laser heater, the plasma heater, the heated fluid, and the heated gas, and wherein the viscous mixture in the chamber is indirectly heated by the heating element.

14. The method of claim 9, further comprising:
introducing additional raw reactant into the chamber when introducing the viscous mixture, wherein at least a portion of the additional raw reactant is converted to usable product in the chamber; and
removing off gases from the reactor for use in a downstream device.

15. A method for producing usable product in a reactor, the method comprising:
introducing a viscous mixture comprising usable product and unconverted reactant into a chamber of a housing through an inlet, wherein the mixture has a temperature greater than ambient temperature when introduced into the chamber;
heating the viscous mixture in the chamber using at least one of an induction heater, an exothermic reaction, a microwave heater, a radio frequency heater, an electrical resistance heater, a laser heater, a plasma heater, and a heated fluid;
converting at least a portion of the unconverted reactant to usable product, wherein at least a portion of the usable product is produced in the viscous mixture; and
transferring the viscous mixture including usable product from the housing through an outlet;
wherein a level of heat in the chamber is adjustable when heating the viscous mixture to control a flow of the viscous mixture through the reactor, such that the flow of the viscous mixture increases when the level of heat is increased and the flow of the viscous mixture decreases when the level of heat is decreased;
wherein the usable product comprises a carbide;
wherein the housing further includes a conductive heating element provided around an inner layer of the housing;
wherein the viscous mixture in the chamber is indirectly heated by the heating element;
wherein the heating element is directly heated by the induction heater;
wherein the induction heater comprises a power supply and an electrically conductive coil configured to receive electric power from the power supply;
wherein the coil is provided around the heating element and produces an induced oscillating magnetic field when electric power is passed through the coil; and
wherein the oscillating magnetic field induces eddy currents in the conductive heating element generating heat that is transferred to the inner layer via conduction.

16. The method of claim 15, wherein the carbide is selected from a group consisting of calcium carbide, lithium carbide, sodium carbide, potassium carbide, rubidium carbide, cesium carbide, francium carbide, beryllium carbide, strontium carbide, magnesium carbide, barium carbide, and radium carbide.

17. The method of claim 15, wherein the viscous mixture is configured to solidify when the level of heat is decreased below a solidifying threshold.

18. The method of claim 15, further comprising:
introducing additional raw reactant into the chamber when introducing the viscous mixture, wherein at least a portion of the additional raw reactant is converted to usable product in the chamber; and
removing off gases from the reactor for use in a downstream device.

19. A method for producing usable product in a reactor, the method comprising:
introducing a viscous mixture comprising usable product and unconverted reactant into a chamber of a housing through an inlet, wherein the mixture has a temperature greater than ambient temperature when introduced into the chamber;
heating the viscous mixture in the chamber using at least one of an induction heater, an exothermic reaction, a microwave heater, a radio frequency heater, an electrical resistance heater, a laser heater, a plasma heater, and a heated fluid;
converting at least a portion of the unconverted reactant to usable product, wherein at least a portion of the usable product is produced in the viscous mixture; and
transferring the viscous mixture including usable product from the housing through an outlet;
wherein a level of heat in the chamber is adjustable when heating the viscous mixture to control a flow of the viscous mixture through the reactor, such that the flow of the viscous mixture increases when the level of heat is increased and the flow of the viscous mixture decreases when the level of heat is decreased;
wherein the usable product comprises a carbide;
wherein the housing further includes a conductive heating element provided around an inner layer of the housing;
wherein the viscous mixture in the chamber is indirectly heated by the heating element;
wherein the heating element is directly heated by the electrical resistance heater; and
wherein the electrical resistance heater comprises a power supply electrically connected to the heating element to pass electric power through the heating element generating heat that is transferred to the inner layer via conduction.

20. The method of claim 19, wherein the carbide is selected from a group consisting of calcium carbide, lithium carbide, sodium carbide, potassium carbide, rubidium carbide, cesium carbide, francium carbide, beryllium carbide, strontium carbide, magnesium carbide, barium carbide, and radium carbide.

21. The method of claim 19, wherein the viscous mixture is configured to solidify when the level of heat is decreased below a solidifying threshold.

22. The method of claim 19, further comprising:
introducing additional raw reactant into the chamber when introducing the viscous mixture, wherein at least a portion of the additional raw reactant is converted to usable product in the chamber; and
removing off gases from the reactor for use in a downstream device.

23. The method of claim 19, wherein transferring the viscous mixture including the usable product from the housing includes transferring the viscous mixture from the housing to a collection device, wherein the collection device is detachably coupled to the housing.

* * * * *